United States Patent
Brooks et al.

(10) Patent No.: US 11,552,811 B2
(45) Date of Patent: Jan. 10, 2023

(54) CONFERENCING WITH ERROR STATE HID NOTIFICATION

(71) Applicant: Hewlett-Packard Development Company, L.P., Spring, TX (US)

(72) Inventors: Robert C. Brooks, Spring, TX (US); Daniel J. Braden, Spring, TX (US); Chi So, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/048,118

(22) PCT Filed: Jun. 14, 2018

(86) PCT No.: PCT/US2018/037660
§ 371 (c)(1),
(2) Date: Oct. 16, 2020

(87) PCT Pub. No.: WO2019/240806
PCT Pub. Date: Dec. 19, 2019

(65) Prior Publication Data
US 2021/0105146 A1    Apr. 8, 2021

(51) Int. Cl.
*H04L 12/18* (2006.01)
*H04N 7/14* (2006.01)

(52) U.S. Cl.
CPC ......... *H04L 12/1818* (2013.01); *H04N 7/147* (2013.01)

(58) Field of Classification Search
CPC .......................... H04L 12/1818; H04N 7/147

USPC ......................................................... 709/204
See application file for complete search history.

(56) References Cited

U.S. PATENT DOCUMENTS

| | | | | |
|---|---|---|---|---|
| 5,189,365 A | * | 2/1993 | Ikeda | G06F 11/261 714/33 |
| 5,414,715 A | * | 5/1995 | Hamblin | G01R 31/2812 714/724 |
| 5,913,062 A | | 6/1999 | Vrvilo et al. | |
| 6,651,184 B1 | * | 11/2003 | Hanes | G06F 11/10 714/44 |
| 6,895,588 B1 | | 5/2005 | Ruberg | |
| 6,956,379 B2 | * | 10/2005 | Mastoris | G01R 31/2806 324/538 |
| 7,793,177 B2 | * | 9/2010 | Chen | G01R 31/318572 714/724 |
| 8,175,539 B2 | * | 5/2012 | Diener | H04L 1/0001 455/69 |
| 8,180,933 B2 | | 5/2012 | Krantz et al. | |

(Continued)

FOREIGN PATENT DOCUMENTS

| | | |
|---|---|---|
| CN | 202035054 | 11/2011 |
| CN | 102915290 | 2/2013 |
| CN | 103109529 B | 10/2016 |

*Primary Examiner* — David P Zarka
(74) *Attorney, Agent, or Firm* — Quarles & Brady LLP

(57) ABSTRACT

A conferencing system may include a data input port and an ingest system to receive signals through the data input port from a separate conference data source. The ingest system may include a notification subsystem to: identify an error state with respect to the signals received through the data input port; and output a human interface device (HID) notification to a conferencing application, wherein the HID notification includes the identified error state.

16 Claims, 5 Drawing Sheets

(56) References Cited

U.S. PATENT DOCUMENTS

| | | | |
|---|---|---|---|
| 9,614,788 B2 | 4/2017 | Lida et al. | |
| 9,638,742 B2* | 5/2017 | Suto | G01R 31/2815 |
| 9,804,901 B2* | 10/2017 | Gambardella | H04L 67/10 |
| 9,817,596 B2* | 11/2017 | Ju | G11C 7/1072 |
| 9,838,647 B2 | 12/2017 | Lylon et al. | |
| 9,949,063 B2* | 4/2018 | Yong | H04L 67/16 |
| 9,977,707 B1 | 5/2018 | Nagabushanam | |
| 10,346,649 B2* | 7/2019 | Lu | G06K 19/0716 |
| 2004/0041902 A1 | 3/2004 | Washington | |
| 2007/0252612 A1* | 11/2007 | Sylvester | G01R 31/71 |
| | | | 324/762.02 |
| 2013/0201316 A1* | 8/2013 | Binder | H04L 67/12 |
| | | | 701/2 |
| 2014/0257968 A1* | 9/2014 | Carncross | G06Q 30/0242 |
| | | | 705/14.41 |
| 2015/0189331 A1* | 7/2015 | Koo | H04L 65/602 |
| | | | 375/240.27 |
| 2016/0197736 A1* | 7/2016 | Shvarzberg | H04L 12/12 |
| | | | 713/310 |
| 2017/0010832 A1 | 1/2017 | Ju et al. | |
| 2018/0063477 A1 | 3/2018 | Yu | |
| 2018/0063481 A1* | 3/2018 | Yu | H04N 7/15 |
| 2020/0021878 A1* | 1/2020 | Uno | G06F 11/0709 |

\* cited by examiner

US 11,552,811 B2

CONFERENCING WITH ERROR STATE HID NOTIFICATION

BACKGROUND

Conferencing systems, such as videoconferencing systems, facilitate sharing of data across multiple platforms and potentially multiple locations. In some conferencing systems, those sharing data are within a single conference room. In other conferencing systems, those sharing data are located at multiple different locations, where such data is shared across a network.

Figure 1:
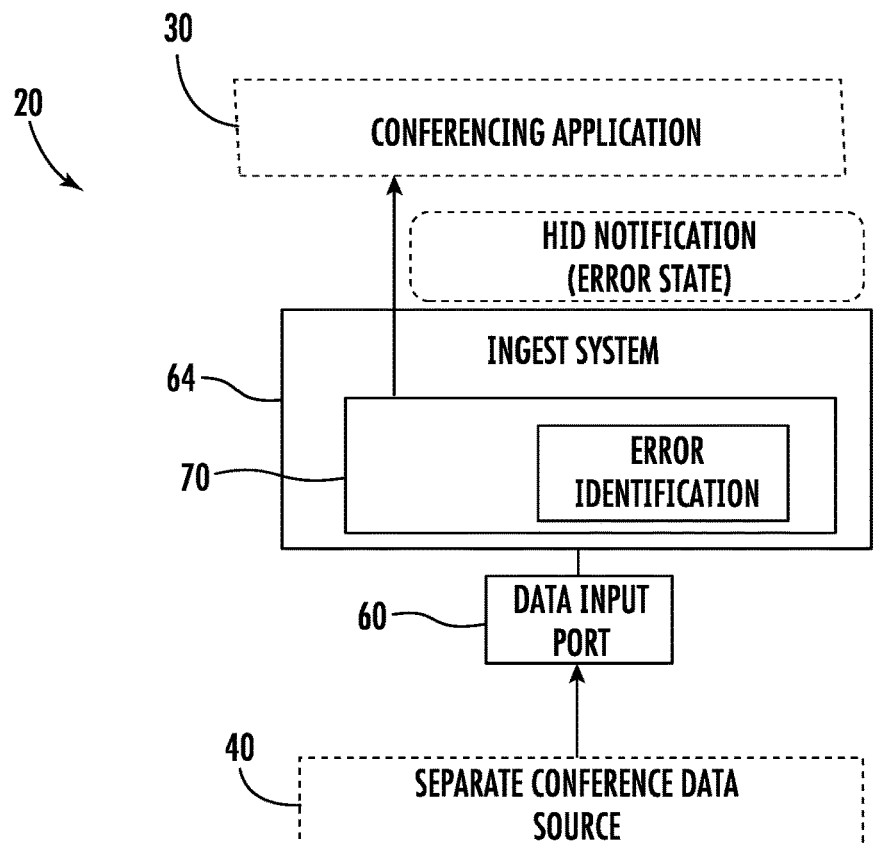
FIG. 1 is a schematic diagram illustrating portions of an example conferencing system.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed herein are example conferencing systems, connector modules and methods that facilitate the sharing of data in a more user-friendly manner. The disclosed conference systems, connector modules and methods indicate the existence of an error state (faulty or non-faulty) with respect to signals being received from a conference data source. For example, the disclosed conference systems, connector modules and methods may indicate an error state such as when the cable from the conference data source has a faulty pin or other connection. As a result, the user is informed that the error may be caused by the conference data source or its connection to the conferencing system.

The disclosed conferencing systems, connector modules and methods utilize an ingest system that receives signals through a data input port from a separate conference data source. The ingest system having notification subsystem that identifies an error state with respect to signals received through the data input port. The subsystem further outputs a human interface device (HID) notification to a conferencing application. The HID notification includes the identified error state. Because the error state is communicated through the HID notification, their state may be communicated using existing protocols, such as existing universal serial bus HID protocols. Because the error state is communicated through the HID notification, the error state may be immediately communicated to the conferencing application upon the connection of the conference data source to the ingest system.

Human Interface Device (HID) protocols refers to the protocols for the Universal Serial Bus specifications also referred to as "Device Class Definition for Human Interface Devices." Such protocols facilitate the configuration of devices at start up or when such devices are plugged in at run time. Such protocols may involve the transmission of HID descriptors which define subsequently transmitted HID notification data and packets.

Disclosed herein is an example conferencing system that may include a data input port and an ingest system to receive signals through the data input port from a separate conference data source. The ingest system may include a notification subsystem to: identify an error state with respect to the signals received through the data input port; and output a human interface device (HID) notification to a conferencing application, wherein the HID notification includes the identified error state.

Disclosed herein is an example human interface device (HID) conferencing connector module that may comprise a data input port to receive signals from a conference data source, an output port for connection to a host unit implementing a conferencing application and a notification subsystem. The notification subsystem is to identify an error state with respect to the signals received through the data input port and output a HID notification for the conferencing application through the output port, wherein the HID notification includes the identified error state.

Disclosed herein is an example conferencing method. The conferencing method may include receiving signals from a conferencing data source through a data input port, identifying an error state with respect to the signals received through the data input port and outputting a HID notification for a conferencing application, wherein the HID notification includes the identified error state.

FIG. 1 schematically illustrates portions of an example conferencing system 20. Conferencing system 20 indicates, to a conferencing application 30 (shown in broken lines), the existence of an error state with respect to signals being received from a separate conference data source 40 (shown in broken lines). For example, conferencing system 20 may indicate an error state such as when the cable from the conference data source 40 has a faulty pin or other connection. As a result, conferencing application 30 may utilize the communicated error state to notify the user of the error and the source of the error as originating with a separate conference data source 40 or its cable connection. Conferencing system 20 comprises data input port 60 and ingest system 64.

Data input port 60 comprises a port by which data from the separate conference data source 40 is received for sharing by the conferencing application 30. In one implementation, data input port 60 may comprise a plurality of connector pins for making connection with corresponding pins or receptacles of a data cable. In one implementation, data input port 60 comprises a high definition multimedia interface (HDMI) port for receiving an HDMI cable connector. In another implementation, data input port 60 may comprise a different type of port for serving as an interface for at least receiving data to be shared by the conferencing application (conference data).

Ingest system 64 comprises at least one processing unit or at least one set of logic elements that receives conference data through data input port 60 and that readies the conference data for use by conferencing application 30. In one implementation, ingest system 64 converts the format of the conference data received through data input port 60 to a format compatible for use by conferencing application 30. In one implementation, ingest system 64 converts the HDMI format of the conference data received through port 60 into USB packets for transmission to the conferencing application 30. In one implementation, ingest system 64 may be embodied as part of at least one circuit chip, such as a field programmable gate array (FPGA) and a USB peripheral controller that, together, convert the HDMI signals and that transmits a HID notification a report to the conferencing application 30.

As further shown by FIG. 1, ingest system 64 comprises a notification subsystem 70. Notification subsystem 70 comprises non-transitory computer-readable instructions or logic elements that analyze the signals (in some implementations, after conversion) received through port 60 to identify an error state with respect to such signals. The notification subsystem further outputs the identified error state as part of the HID notification that is transmitted or output to the conferencing application 30. As a result, the conferencing application 30 is notified of an error state with respect to the data received through port 60. In one implementation, the conferencing application 30 forwards or otherwise communicates the error state to the user of the conferencing system 20 via display or other output device. Rather than left wondering as to why the shared conference data is not being displayed, the user may be informed of the faulty connection or faulty state of the conference data source.

Figure 2:
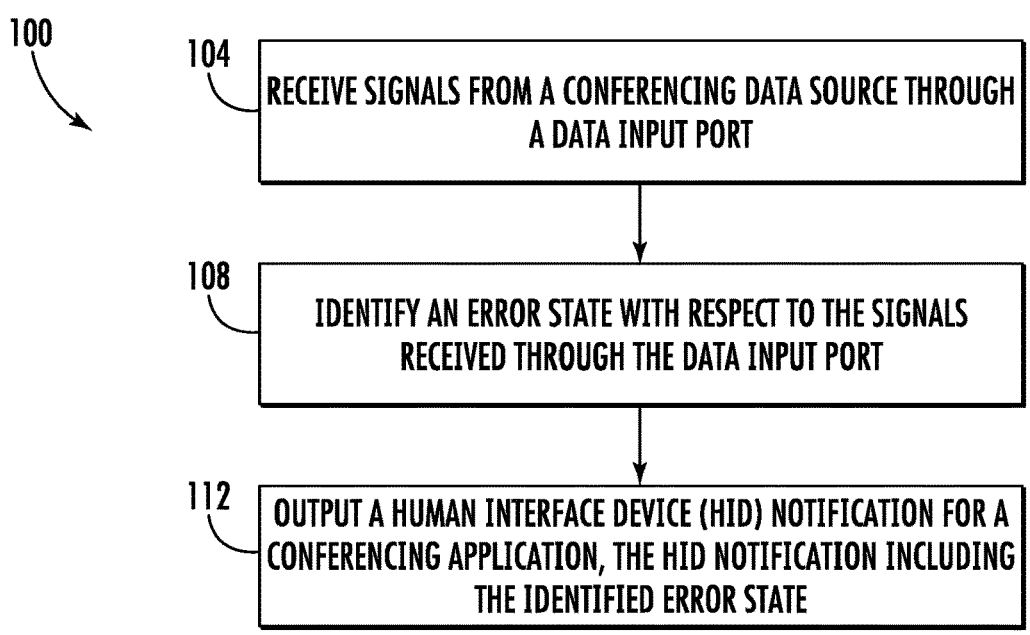
FIG. 2 is a flow diagram of an example conferencing method.

FIG. 2 is a flow diagram of an example conferencing method 100. Conferencing method 100 indicates, to a conferencing application, the existence of an error state with respect to signals (or lack thereof) being received from a separate conference data source. For example, conferencing method 100 may indicate an error state such as when the cable from the conference data source has a faulty pin or other connection. As a result, conferencing method 100 may utilize the communicated error state to notify the user of the error and the source of the error as originating with a separate conference data source 40 or its cable connection. Although method 100 is described in the context of being carried out by conferencing system 20, it should be appreciated that method 100 may likewise be carried out with any of the following described conferencing systems or with other similar conferencing systems.

As indicated by block 104, an ingest system 64 receive signals from a conferencing data source 40 through a data input port 60. In some implementations, the signals may comprise a stream of HDMI signals from a conferencing data source, such as an external tablet computer, laptop computer, notebook computer, tablet device, smart phone, video player or other source of conference data to be shared, such as still or video images.

As indicated by block 108, notification subsystem 70 of the ingest system analyzes the received signals and identifies an error state with respect to the signals received through the data input port. In one implementation, the error state may be binary, being in either a faulty state or non-faulty state. In another implementation, the error state may be a state where the extent or degree of error has exceeded or otherwise satisfied a predetermined error threshold. For example, the error threshold may be the existence of an error state for a predetermined amount of time. In another implementation, the error threshold may be existence of a predetermined extent or number of errors or an error score based upon the type of errors identified. In some implementations, especially in those circumstances where the type of cable or type of connector connected to input port 60 is predetermined, the error state may be non-binary in that the error state specifically indicates one of a plurality of different types of errors and/or sources of errors. For example, the faulty or error state may indicate which pin connector is faulty or what signals or communication channels are faulty.

As indicated by block 112, notification subsystem 70 and ingest system 64 output and HID notification for conferencing application 30. The HID notification includes the identified faulty or error state. In one implementation, the HID notification may comprise a HID report comprising a digital byte, wherein one bit of the byte indicates an on/off, connected/disconnected state of the conference data source 40 and wherein another bit of the byte indicates the error state. In another implementation, the error state may be communicated as part of a separate HID notification having a length of a single byte or as part of a larger HID report or notification. In one implementation, the conferencing application 30 may then utilize the received HID notification with the error state to notify the user or other persons using the conferencing system of the error.

Figure 3:
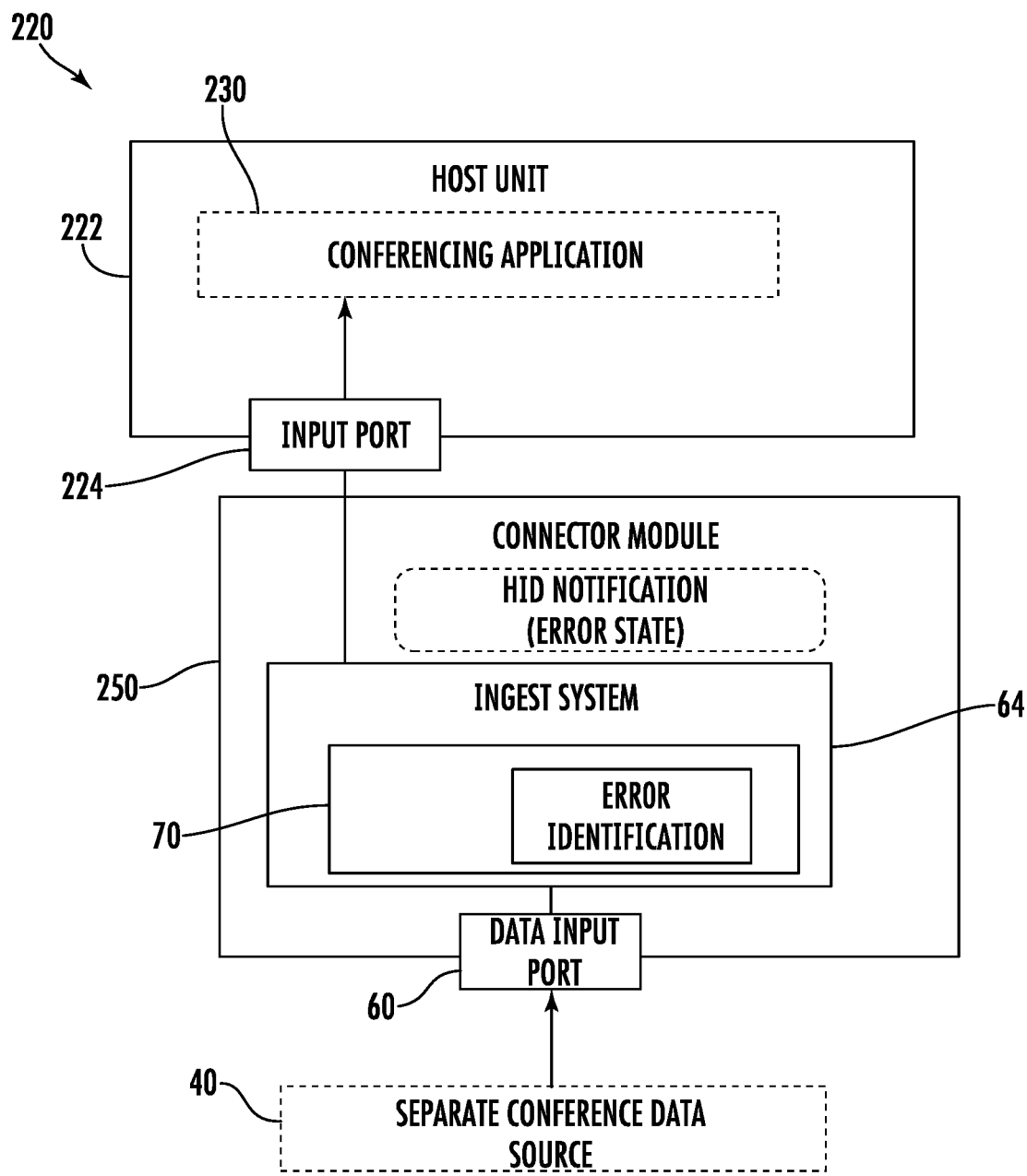
FIG. 3 is a schematic diagram illustrating portions of an example conferencing system.

FIG. 3 schematically illustrates portions of an example conferencing system 220. Conferencing system 220 comprises host unit 222 and connector module 250. Those components of system 220 which correspond to components of system 20 are numbered similarly.

Host unit 222 comprises host input port 224 and conferencing application 230. Host input port 224 receives conference data signals from connector module 250. In one implementation, host input port 224 comprises a USB port. For purposes of this disclosure, the term "USB" refers to all past, present and future implementations or versions of the Universal Serial Bus protocols that may utilize the present or future variations of the HID protocol.

Conferencing application 230 comprises a program carried out by a processing unit pursuant to non-transitory computer-readable instructions contained in a non-transitory memory or embodied as logic elements/circuitry. Conferencing application 230 receives the conference data through input port 224 and transmit such data to participants in a conferencing session. Conferencing application 230 may additionally receive data from such participants and present such information locally. In one implementation, conferencing application 230 may comprise a telecommunications application software product that provides video chat and voice calls between computers, tablets, mobile devices, game consoles, smart watches via the Internet, telephones and the like. In one implementation, conferencing application 230 comprises a Skype Room Systems conferencing application, such as provided by MICROSOFT. In yet other implementations, conferencing application 230 may comprise other telecommunication applications that facilitate video conferencing or other forms of conferencing.

Connector module 250 comprises a separately housed module or unit, distinct from host unit 222. Connector module 250 serves as an interface between a separate conference data source 40 and the host unit 222. Connector module 250 comprises data input port 60 and ingest system 64 (described above). In one implementation, connector module 250 may comprise part of a modular computing system, such as the SLICE Video Ingest Module, commercially available from HP, INC., as further modified to include notification subsystem 70. In other implementations, connector module 250 may comprise other intervening modules which serve as a communications interface between conference data source 40 and a host unit 222.

In operation, conferencing system 220 operates in a manner similar to conferencing system 20 described above. Upon being powered up or turned on, data source 40 transmits signals to connector module 250 through data input port 60. Such signals may be complete (a non-faulty state) or may be partial or incomplete (a faulty state). Notification subsystem 70 analyzes such signals to identify and error state with respect to the signals. The error state is incorporated as part of a HID notification which is transmitted by connector module 250 to conferencing application 230 through input port 224 of host unit 222. The host unit 222 may then communicate the error state to the user or users of conferencing system 220.

Figure 4:
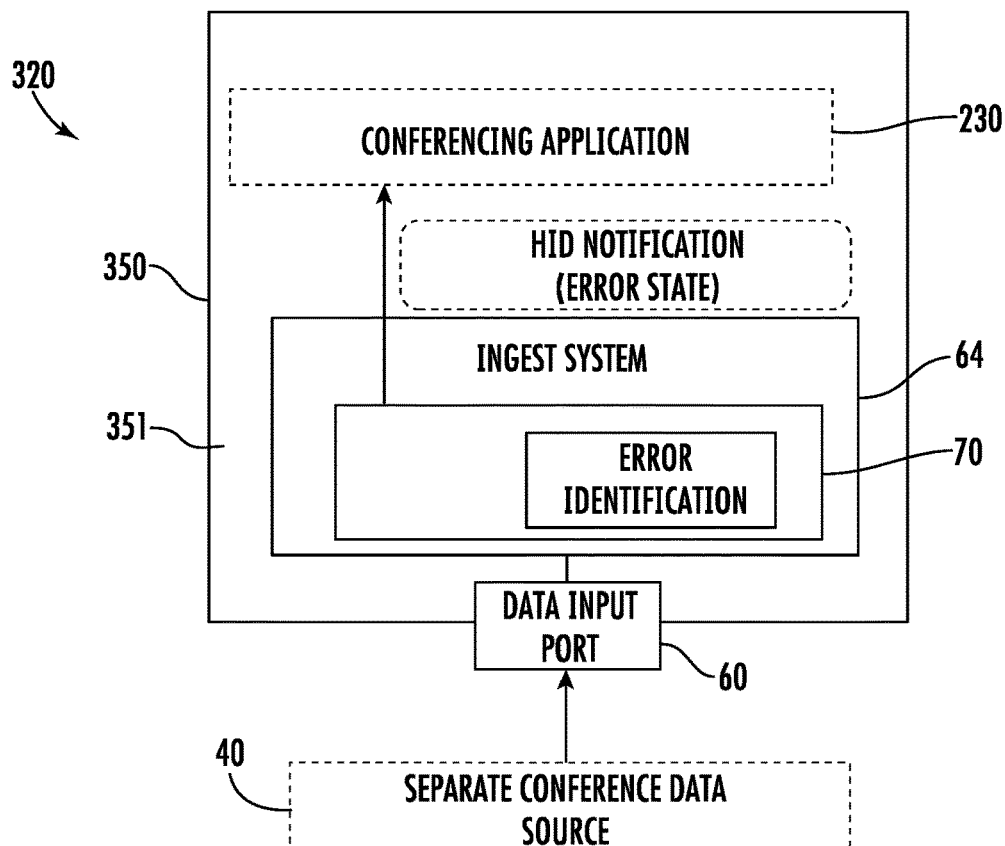
FIG. 4 is a schematic diagram illustrating portions of an example conferencing system.

FIG. 4 schematically illustrates portions of an example conferencing system 320. Conferencing system 320 is similar to conferencing system 220 except that host unit 222 and connector module 250 are embodied as a single conferencing unit 350, enclosed within a single outer housing 351. Those components of conferencing system 320 which correspond to components of conferencing system 220 are numbered similarly. Conferencing system 320 operates in a fashion similar to that of conferencing system 220 except that the HID notification output by ingest system 64 is transmitted to conferencing application 230, all within a single unit 350 and housing 351.

Figure 5:
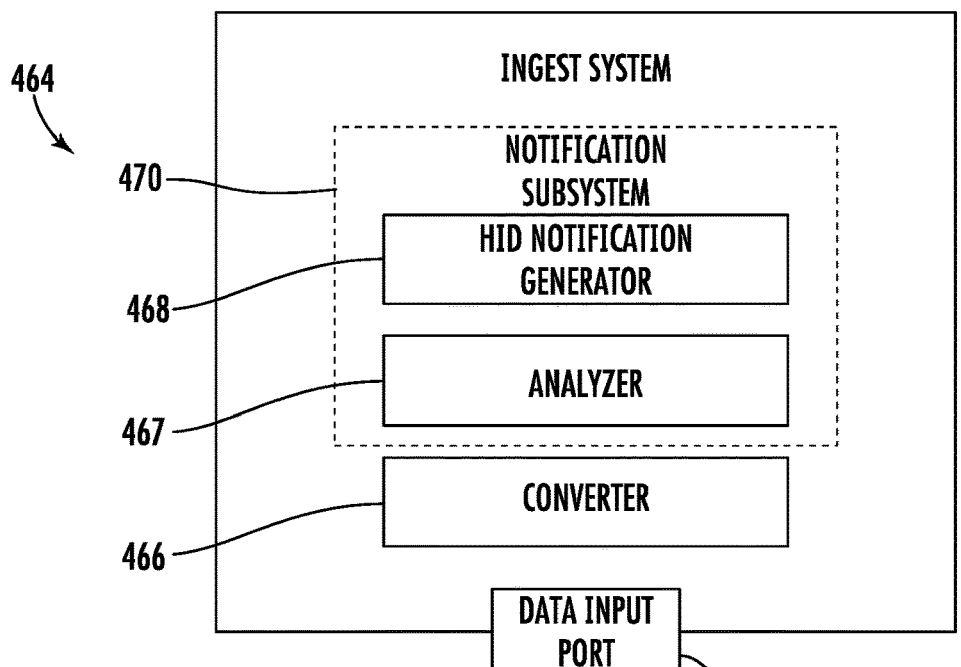
FIG. 5 is a schematic diagram illustrating portions of an example ingest system.

FIG. 5 schematically illustrates portions of an example ingest system 464 connected to data port 60. Ingest system 464 may be utilized in place of ingest system 64 described above. Ingest system 464 comprises converter 466, analyzer 467 and HID notification generator 468.

Converter 466 converts the data signals received through data input port 60 into a format compatible with a conferencing application, such as conferencing application 230. In one implementation, converter 466 comprises an integrated circuit or a circuit chip. In one implementation, converter 466 comprises a circuit that is to convert HDMI data signals into a format compatible for use by analyzer 467 and for use by conferencing application 230.

Analyzer 467 analyzes the transformed or converted signals from converter 466 for errors. In one implementation, analyzer 467 comprises an integrated circuit or circuit chip. In one implementation, analyzer 467 comprises a field programmable gate array (FPGA) circuit chip. In one implementation, the error state output by analyzer 467 may be binary, being in either a faulty state or non-faulty state. In another implementation, the error state output by analyzer 467 may be a state where the extent or degree of error has exceeded or otherwise satisfied a predetermined error threshold. For example, the error threshold may be the existence of an error state for a predetermined amount of time. In another implementation, the error threshold may be existence of a predetermined extent or number of errors or an error score based upon the type of errors identified. In some implementations, especially in those circumstances where the type of cable or type of connector connected to input port 60 is predetermined, the error state may be non-binary in that the error state specifically indicates one of a plurality of different types of errors and/or sources of errors. For example, the faulty or error state may indicate which pin connector is faulty or what signals or communication channels are faulty. The indicated error state may be more than a binary indicator: (1) a faulty state or (2) a non-faulty state. In such an implementation, the number of bits indicating the error state may be greater than a single bit. For example, in one implementation a HID notification may comprise a byte having a single bit indicating an on-off, connected-disconnected state and at least two other bits indicating the type of error.

HID notification generator 468 generates a HID report or notification which is output are transmitted to a conferencing application, such as conferencing application 230. HID notification generator 468 generates the HID notification using the identified error state output by analyzer 467. In one implementation, HID notification generator 468 outputs and HID notification that indicates an on-off state and that also identifies the error state of the signals received through data input port 60. In one implementation, HID notification generator 468 outputs a single byte HID notification, wherein one bit of the notification indicates an on-off, connected-disconnected state of the separate conference data source 40 and wherein a second bit of the notification indicates an error state of the conference data source 40. In one implementation, HID notification generator 468 outputs a multi-byte HID notification including the error state or a separate HID notification dedicated to the error state. In one implementation, HID notification generator 468 comprises a USB FX3 peripheral controller, such as commercially available from Cypress Semiconductor Corp. in San Jose California. In other implementations, HID notification generator 468 may comprise other peripheral controllers that generate and output an HID reporter notification.

As indicated by broken lines, analyzer 467 and HID notification generator 468 cooperate serve as a notification subsystem 470. Notification subsystem 470 functions similar to notification subsystem 70 described above. HID notification generator 468 additionally serves to provide conferencing application 230 with additional notices or information in HID notifications or reports.

Figure 6:
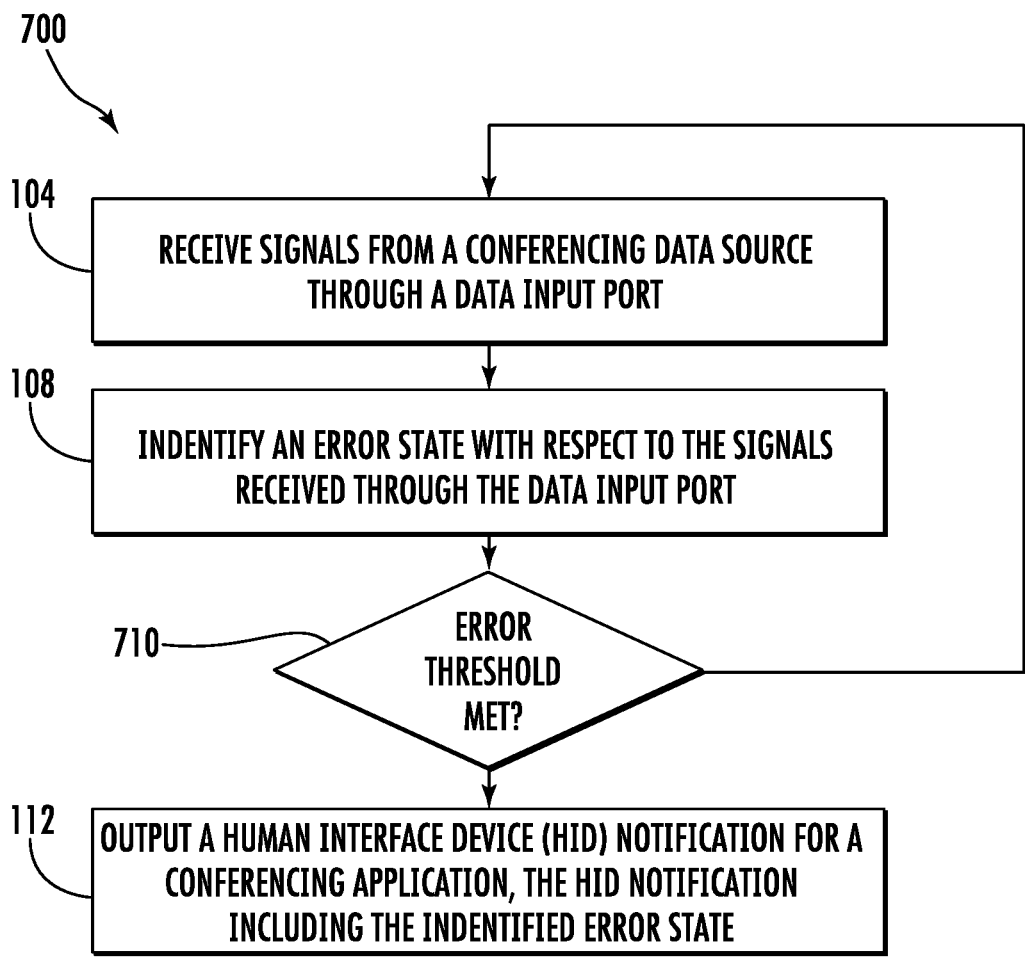
FIG. 6 is a flow diagram of an example conferencing method.

In some implementations, analyzer 467 and/or notification subsystem 70, 470 outputs a faulty state or an error automatically in response to the existence of any identified error for any amount of time. In another implementation, analyzer 467 and/or notification subsystem 70, 470 outputs a faulty state or an error based upon a comparison of an identified error or group of errors to at least one predefined criteria, trigger or threshold before populating a HID notification with an error state that indicates a faulty state or error. FIG. 6 is a flow diagram of an example method 700 that may be carried out by any of systems 20, 220, 320 and/or ingest system 464 described above. Method 700 is similar to method 100 described above except that method 700 additionally includes comparison block 710. Those remaining blocks of method 700 correspond to blocks of method 100 are numbered similarly.

As indicated by block 710, the logic elements or processing unit of analyzer 467 and/or notification subsystem 70, 270, upon identifying that the signals indicate an error, compares the identified error to an error threshold. In response to the error threshold being met, the error state indicating a faulty state is provided in the HID notification that is output to the conferencing application. In response to the error or errors not meeting the error threshold, the HID report or notification that is output does not include the error state, indicating no error.

The error threshold against which the identified error or group of errors are compared in block 710 may be the extent or degree of error has exceeded or otherwise satisfied a predetermined error threshold. For example, the error threshold may be the existence of an error state for a predetermined amount of time. In another implementation, the error threshold may be a predetermined extent or number of errors or an error score based upon the type of errors identified. In some implementations, different errors may be differently weighted, wherein the total score of the error or multiple layers as compared against an error threshold value.

Figure 7:
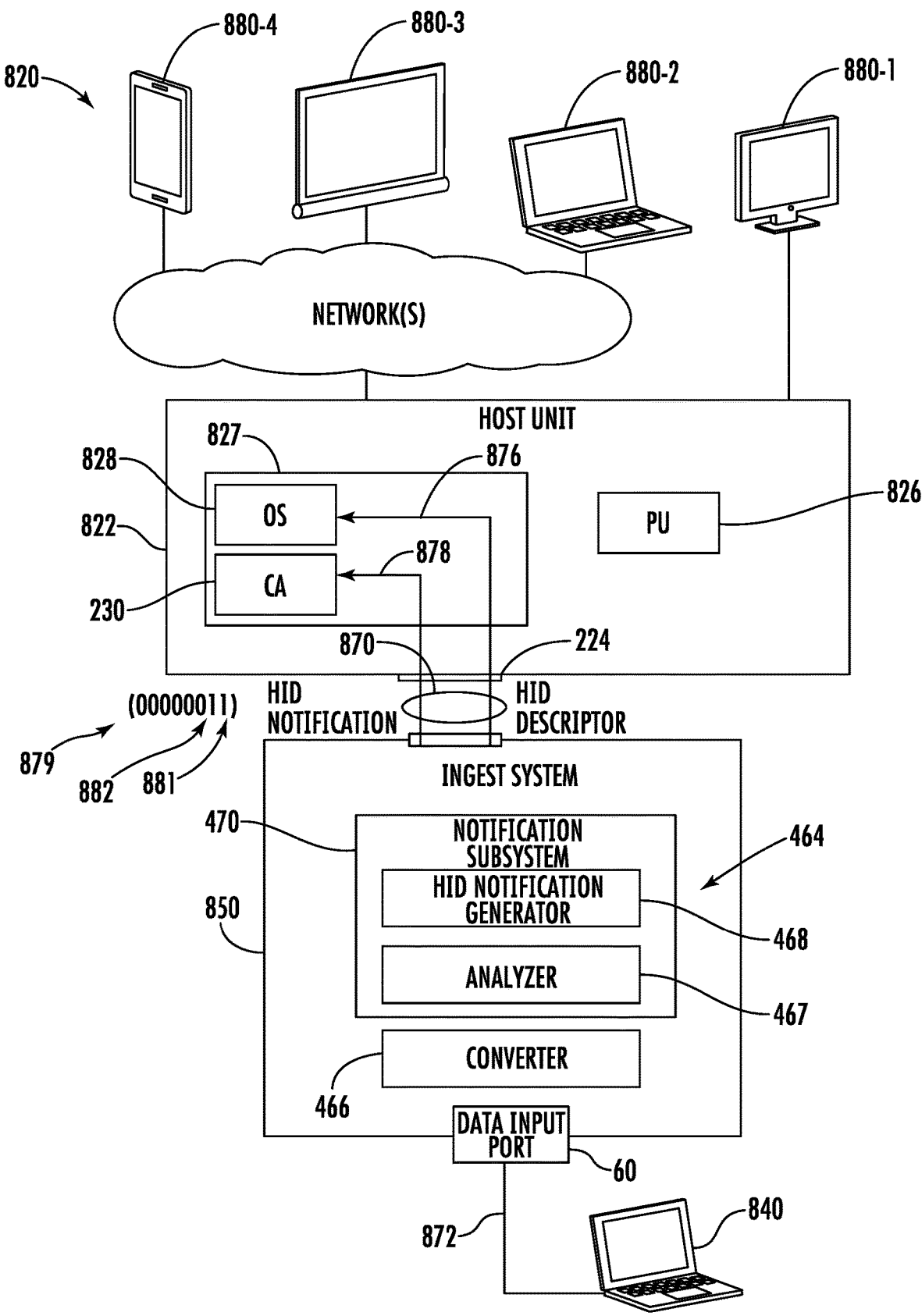
FIG. 7 is a schematic diagram illustrating portions of an example conferencing system.

FIG. 7 schematically illustrates portions of an example conferencing system 820. Conferencing system 820 comprises host unit 822 and connector module 850. Conferencing system 820 facilitates the sharing of conference data from a separate conference data source 840 to conference participants 880-1, 880-2, 880-3, 880-4 (collectively referred to as participants 880). Separate conference data source 840, although shown as a laptop or notebook computer, may comprise any of a variety of data sources such as a tablet computer or device, smart phone, video player or other source of conference data to be shared, such as still or video images. Likewise, participants 880 may comprise any of a variety of computing or display devices such as a tablet computer or device, smart phone, video player or other source of conference data to be shared, such as still or video images. In the example illustrated, participant 880-1 comprises a local monitor or display directly connected to host unit 222 and a wired or wireless fashion. Participants 880-2 comprise a laptop or notebook computer. Participant 880-3 comprises a conference screen such as found in a conference room. Participant 880-4 comprises a tablet computer or smart phone. Participants 880-2, 880-3 and 880-4 may be connected to host unit 822 in a wired or wireless fashion across a local area network or wide area network. Such participants 880 may be connected to such networks by routers or modems or other intermediate devices as appropriate.

Host unit 822 is similar to host unit 222 described above except that host unit 822 is specifically illustrated as comprising input port 224 (described above), processing unit 826 and non-transitory computer-readable medium 827. Processing unit 826 comprise at least one processing unit that carries out instructions contained in medium 827.

Medium 827 comprises a non-transitory memory that stores instructions for processing and 826. Medium 827 stores operating system 828 and conferencing application 230 (described above). Operating under operating system 828, processing unit 826 carries out instructions contained in conferencing application 230 share conference data received from conference data source 840 with each of participants 880.

Connector module 850 is similar to connector module 250 described above except that connector module 850 is specifically illustrated as comprising ingest system 464 (described above) and notification subsystem 470. Those remaining components of connector module 850 which correspond to connector module 250 and/or ingest system 464 are numbered similarly. Connector module 850 is removably connected to host unit 822 be a connection cable 870. In one implementation, connection cable 860 may comprise a USB cable. Connector module 850 is removably connected to and in communication with via a data source cable 872. Data source cable 872 may comprise an HDMI cable or other type of cable.

Conferencing system 820 may operate in a fashion similar to the above described conferencing systems, carrying out method 100 and/or method 700 described above. In one implementation, connector module 850, upon being connected to host unit 822, independent of the on-off state of conference data source 840 and further independent of module 850, provides operating system 828 of host unit 822 with at least one HID descriptor (as indicated by arrow 876). The HID descriptor 876 defines how bits in the subsequent received HID report or notification are to be understood or interpreted. The HID descriptor follows HID protocol. The information of the descriptor 876 is stored in the memory associated with operating system 828.

Upon being powered on or connected to data input port 60 while being powered on, separate conference data source 840 transmits signals to connector module 850 through data input port 60. As described above, converter 466 converts the data signals received through data input port 60 into a format compatible with a conferencing application, such as conferencing application 230. Analyzer 467 analyzes the transformed or converted signals from converter 466 for errors.

In one implementation, the error state output by analyzer 467 may be binary, being in either a faulty state or non-faulty state. In another implementation, analyzer 467 may carry out method 700 described above, wherein the error state output by analyzer 467 may be a state where the extent or degree of error has exceeded or otherwise satisfied a predetermined error threshold. For example, the error threshold may be the existence of an error state for a predetermined amount of time. In another implementation, the error threshold may be a predetermined extent or number of errors or an error score based upon the type of errors identified.

In some implementations, especially in those circumstances where the type of cable or type of connector connected to input port 60 is predetermined, the error state may be non-binary in that the error state specifically indicates one of a plurality of different types of errors and/or sources of errors. For example, the faulty or error state may indicate which connector pin is faulty or what signals or communication channels are faulty. The indicated error state may be more than a binary indicator: (1) a faulty state or (2) a non-faulty state. In such an implementation, the number of bits indicating the error state may be greater than a single bit. For example, in one implementation a HID notification may comprise a byte having a single bit indicating an on-off, connected-disconnected state and at least two other bits indicating an error in the type of error.

HID notification generator 468 generates a HID report or notification which is output and transmitted to a conferencing application, such as conferencing application 230, as indicated by arrow 878. HID notification generator 468 generates the HID notification using the identified error state output by analyzer 467. In one implementation, HID notification generator 468 outputs a HID notification that indicates an on-off state and that also identifies the error state of the signals received through data input port 60. In one implementation, HID notification generator 468 outputs a single byte HID notification 879, wherein one bit 881 of the notification indicates an on-off, connected-disconnected state of the separate conference data source 840 and wherein a second bit 882 of the notification indicates an error state of the conference data source 840. In one implementation, HID notification generator 468 outputs a multi-byte HID notification including the error state or a separate HID notification dedicated to the error state. In one implementation, the error state may be indicated by greater than one bit or may be provided with a different HID notification communicating other information.

Upon receiving the HID report, conferencing application 230 may consult operating system 828 for the HID descriptor 876. Based upon the HID descriptor 876, conferencing application 230 may read the HID notification indicating an error state, either faulty or non-faulty (or faulty and type of error as described above). In response to a faulty error state, conferencing application 230 may output an error notification indicating the error from cable 872 or source 840. The notification may be presented on the monitor or display of the local participant 880-1 or other of participants 880. In one implementation, the notification may be output and presented to source 840 for display or presentation. As a result, those users of conferencing system 820 may nearly immediately discern the cause or the general cause for the failure of system 820 to display the conference data being shared by source 840, the faulty connection 872 and/or faulty source 840.

Although the present disclosure has been described with reference to example implementations, workers skilled in the art will recognize that changes may be made in form and detail without departing from the scope of the claimed subject matter. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A conferencing system comprising:
   a processor; and
   a non-transitory storage medium storing a conferencing application and error notification instructions;
   input connector pins to receive signals from a separate conference data source, the signals comprising conference data,
   wherein the conferencing application is executable on the processor to transmit the conference data in a conference session to a plurality of conference participants;
   wherein the error notification instructions are executable on the processor to:
     identify an error state with respect to the signals comprising the conference data received at the input connector pins, the identified error state representing a fault of a connection to the input connector pins; and
     output a human interface device (HID) notification to the conferencing application, the HID notification including the identified error state,
   wherein the conferencing application is executable on the processor to transmit the HID notification to the plurality of conference participants that notifies the plurality of conference participants of the identified error state.

2. The conferencing system of claim 1, wherein the HID notification comprises an indicator indicating an on-off state of the separate conference data source.

3. The conferencing system of claim 2, wherein the HID notification comprises a further indicator indicating the identified error state.

4. The conferencing system of claim 1, wherein the identified error state is binary, comprising either an error indication or a no error indication.

5. The conferencing system of claim 1, wherein the identified error state comprises an error classification indication.

6. The conferencing system of claim 1, wherein the identifying of the error state comprises a comparison of a number of errors against a threshold.

7. The conferencing system of claim 1, wherein the identified error state represents a fault of a cable connected to the input connector pins.

8. A non-transitory machine-readable storage medium storing instructions that upon execution cause a system to:
   receive, via signals received at input connector pins, conference data from a conference data source;
   transmit, with a conferencing application, the conference data in a conference session to a plurality of conference participants;
   identify an error state with respect to the signals comprising the conference data received at the input connector pins, the identified error state representing a fault of a connection to the input connector pins;
   output a human interface device (HID) notification to the conferencing application, the HID notification including the identified error state; and
   transmit, with the conference application, the HID notification to plurality of conference participants that notifies the plurality of conference participants of the identified error state.

9. The non-transitory machine-readable storage medium of claim 8, wherein the HID notification comprises an indicator indicating an on-off state of the conference data source.

10. The non-transitory machine-readable storage medium of claim 9, wherein the HID notification comprises a further indicator indicating the identified error state.

11. A method comprising:
    receiving signals from a conference data source through a data input port, wherein the signals comprise conference data;
    transmitting, by a conferencing application in a conference session involving a plurality of conference participants, the conference data to the plurality of conference participants;
    identifying, by a system, an error state with respect to the signals comprising the conference data received through the data input port, wherein the identified error state represents a fault of a connection to the input data port;
    outputting, by the system, a human interface device (HID) notification to the conferencing application, the HID notification including the identified error state; and
    transmitting, by the conferencing application, the HID notification to the plurality of conference participants that notifies the plurality of conference participants of the identified error state.

12. The method of claim 11, wherein the identified error state represents a fault of a cable connected to the data input port.

13. The method of claim 11, wherein the HID notification comprises a first indicator indicating an on-off state of the conference data source, and a second indicator indicating the identified error state.

14. The conferencing system of claim 1, further comprising:
    a converter to convert the signals to a format of the conferencing application, wherein the error notification instructions are executable on the processor to identify the error state based on an analysis of the signals after the conversion.

15. The conferencing system of claim 14, comprising:
a chip to perform the analysis of the signals after the conversion.

16. The non-transitory machine-readable storage medium of claim 10, wherein the identified error state represents a fault of a cable connected to the input connector pins.

* * * * *